US007602401B2

(12) United States Patent
Nishida et al.

(10) Patent No.: US 7,602,401 B2
(45) Date of Patent: Oct. 13, 2009

(54) IMAGE DISPLAY APPARATUS AND METHOD, PROGRAM THEREFOR, AND RECORDING MEDIUM HAVING RECORDED THEREON THE SAME

(75) Inventors: Koji Nishida, Tokyo (JP); Mitsuyasu Asano, Tokyo (JP); Kazuhiko Ueda, Kanagawa (JP)

(73) Assignee: Sony Corporation, Tokyo (JP)

( * ) Notice: Subject to any disclaimer, the term of this patent is extended or adjusted under 35 U.S.C. 154(b) by 387 days.

(21) Appl. No.: 11/599,477

(22) Filed: Nov. 15, 2006

(65) Prior Publication Data

US 2007/0120869 A1 May 31, 2007

(30) Foreign Application Priority Data

Nov. 24, 2005 (JP) ............................ 2005-338228

(51) Int. Cl.

| | |
|---|---|
| ***G09G 5/00*** | (2006.01) |
| ***G09G 5/36*** | (2006.01) |
| ***G09G 3/00*** | (2006.01) |
| ***G09G 3/20*** | (2006.01) |
| ***G09G 5/02*** | (2006.01) |
| ***H04N 7/30*** | (2006.01) |
| ***H04N 9/64*** | (2006.01) |

(52) U.S. Cl. ....................... 345/589; 345/606; 345/690; 345/214; 345/22; 348/708; 348/760; 358/516; 358/518; 358/519; 358/525; 382/167; 382/300

(58) Field of Classification Search ............. 345/87–88, 345/581, 589, 606, 611, 613, 618, 690, 694–696, 345/698, 214, 204–205, 22, 63; 348/599, 348/612, 708, 742, 760, 761, 766; 382/300, 382/162, 167, 254, 266, 274; 358/515–525, 358/461

See application file for complete search history.

(56) References Cited

U.S. PATENT DOCUMENTS

| | | | | |
|---|---|---|---|---|
| 2004/0169747 A1 * | 9/2004 | Ono et al. | ................... | 348/272 |
| 2005/0088385 A1 * | 4/2005 | Elliott et al. | .................. | 345/87 |

FOREIGN PATENT DOCUMENTS

| | | |
|---|---|---|
| JP | 2003-259386 | 9/2003 |

* cited by examiner

*Primary Examiner*—Sajous Wesner
(74) *Attorney, Agent, or Firm*—Finnegan, Henderson, Farabow, Garrett & Dunner, L.L.P.

(57) ABSTRACT

An image display apparatus for displaying an image on a panel having pixels each including a plurality of subpixels of different colors includes an interpolation operator interpolating consecutive sampling values of pieces of input color data to correct phases of the pieces of input color data on the basis of positions of the subpixels in each pixel and output pieces of output color data; an area detector detecting a specific area from the image displayed on the panel by processing the input color data or the output color data; and a correction unit computing and outputting weighted averages of the pieces of input color data and the pieces of output color data on the basis of a detection result obtained by the area detector. The specific area is an edge portion, a portion where a luminance level gradually changes, or a repeated-pattern portion where a spatial frequency is high.

7 Claims, 8 Drawing Sheets

(Prior Art)

(Prior Art)

IMAGE DISPLAY APPARATUS AND METHOD, PROGRAM THEREFOR, AND RECORDING MEDIUM HAVING RECORDED THEREON THE SAME

CROSS REFERENCES TO RELATED APPLICATIONS

The present invention contains subject matter related to Japanese Patent Application JP 2005-338228 filed in the Japanese Patent Office on Nov. 24, 2005, the entire contents of which are incorporated herein by reference.

BACKGROUND OF THE INVENTION

1. Field of the Invention

The present invention relates to image display apparatuses and methods, programs therefor, and recording media having recorded thereon the same, which can be applied to, for example, a monitor including a liquid crystal display (LCD) panel in which the coloring of an edge or the like is prevented by correcting the phases of pieces of color data on the basis of the arrangement (positions) of subpixels in each pixel, and, on the basis of the detection result of a specific areas the weighted averages of the pieces of coloring-prevented color data and the pieces of input color data are computed and output, thereby preventing the coloring of the edge or the like by correcting the phases of the pieces of color data on the basis of the arrangement (positions) of the subpixels in each pixel while preventing a change in color depending on the viewing direction.

2. Description of the Related Art

In flat displays of the related art including LCDs and plasma display panels (PDPs), each pixel includes a plurality of subpixels of different colors, which are driven by associated pieces of color data to display a desired image.

That is, as shown in FIG. 6, a display device 1 of this type includes red subpixels 2R, green subpixels 2G, and blue subpixels 2B, which are sequentially and recursively arranged in a horizontal direction. Three consecutive subpixels 2R, 2G, and 2B form one pixel 3.

With regard to such a display device, a method has been proposed in, for example, Japanese Unexamined Patent Application Publication 2003-259386. The method involves correcting the phases of pieces of color data to be supplied to drive the associated subpixels on the basis of the arrangement (positions) of the subpixels, thereby increasing the apparent resolution.

In this type of display device, in the case where the subpixels are simply driven by the associated pieces of color data, when gray is displayed, an edge portion and a portion where the luminance gradually changes in gradation or the like seem to be colored.

That is, each piece of color data is a sampling value obtained at a timing for scanning the center of each pixel by raster scanning. Accordingly, as shown in FIG. 7A, in an edge portion in the case where gray is displayed, the luminance levels of three subpixels 2R, 2G, and 2B included in one pixel are reduced at the same time. Therefore, in this case, the color of a subpixel 2B1 which is the most adjacent to the edge and whose luminance level is high becomes striking in the edge portion, and hence, the edge portion seems to be colored with the color of the subpixel 2B1. In FIGS. 7A to 7D, the luminance levels of the subpixels 2R, 2G, and 2B are indicated in a height direction.

At the same time, as shown in FIG. 7B, in a portion where the luminance level gradually changes in the case where gray is displayed, the luminance levels of three subpixels 2R, 2G, and 2B included in one pixel are sequentially reduced step by step. Therefore, in this case, the color of the subpixel 2B on the side where the luminance level is gradually reduced becomes striking, and the portion where the luminance level gradually changes seems to be colored with the color of the subpixel 2B.

In order to solve these problems, one method involves correcting the phases of pieces of color data to be supplied to drive the subpixels 2R, 2G, and 2B on the basis of the arrangement (positions) of the subpixels 2R, 2G, and 2B in each pixel 3.

That is, as shown in FIGS. 7C and 7D in contrast to FIGS. 7A and 7B, in the case where the red, green, and blue subpixels 2R, 2G, and 2B are sequentially and recursively arranged, and the three consecutive red, green, and blue subpixels 2R, 2G, and 2B form one pixel 3, the subpixel 2G at the center of the pixel 3 is driven in a manner similar to the related art. With regard to the subpixel 2R prior to the central subpixel 2G, the phase of the associated piece of color data is corrected for the preceding portion, and the subpixel 2R is driven using the phase-corrected color data. In contrast, with regard to the subpixel 2B subsequent to the central subpixel 2G, the phase of the associated piece of color data is corrected for the portion subsequent to the subpixel 2G, and the subpixel 2B is driven using the phase-corrected color data.

Accordingly, in the edge portion, the luminance levels of the subsequent subpixel 2B and the preceding subpixel 2R subsequent to this subpixel 2B are sequentially reduced step by step, thereby preventing the coloring of the edge portion. In the portion where the luminance level gradually changes in gradation or the like, the luminance levels of the subpixels 2R, 2G, and 2B are sequentially reduced so as to correspond to the reduction in the luminance level, thereby preventing the coloring of this portion.

However, in this type of display device, as in a twisted nematic (TW) liquid crystal by way of example, luminance characteristics change depending on the viewing direction. Accordingly, when the phases of pieces of color data are corrected on the basis of the arrangement (positions) of the subpixels 2R, 2G, and 2B in each pixel 3 in the above-described manner, the color changes depending on the viewing direction in a repeated-pattern portion where the spatial frequency is high.

That is, as shown in FIGS. 8A and 8B in contrast to FIGS. 7A to 7D, in the case where the luminance levels of the subpixels 2R, 2G, and 2B included in each pixel 3 are maintained at the same level, and the luminance level changes in units of pixels, the luminance level ratio among the subpixels 2R, 2G, and 2B in each pixel 3 does not change between the case shown in FIG. 8A when viewed from the front and the case shown in FIG. 8B when viewed diagonally. In this case, the color does not change when the viewing direction changes.

However, as shown in FIGS. 8C and 8D in contrast to FIGS. 8A and 8B, when the phases of pieces of color data are corrected on the basis of the arrangement (positions) of the subpixels 2R, 2G, and 2B, the luminance level ratio among the subpixels 2R, 2G, and 2B in each pixel 3 changes between the case when viewed from the front and the case when viewed diagonally. Therefore, in this case, the color changes depending on the viewing direction. When the driving of the subpixels 2R, 2G, and 2B is adjusted so as to achieve the color balance when viewed from the front, the color balance when viewed diagonally is disrupted.

SUMMARY OF THE INVENTION

It is desirable to provide an image display apparatus and method, a program therefor, and a recording medium having recorded thereon the same for preventing the coloring of an edge or the like by correcting the phases of pieces of color data on the basis of the arrangement (positions) of subpixels in each pixel while preventing a change in color depending on the viewing direction.

According to a first embodiment of the present invention, there is provided an image display apparatus for displaying an image on an image display panel having a plurality of pixels each including a plurality of subpixels of different colors. The image display apparatus includes the following elements: an interpolation operator operable to interpolate consecutive sampling values of pieces of input color data supplied to drive the image display panel to thereby correct phases of the pieces of input color data on the basis of positions of the subpixels in each pixel and output pieces of output color data; an area detector operable to detect a specific area from the image displayed on the image display panel by processing the pieces of input color data or the pieces of output color data; and a correction unit operable to compute and output weighted averages of the pieces of input color data and the pieces of output color data on the basis of a detection result obtained by the area detector. The specific area is an edge portion, a portion where a luminance level gradually changes, or a repeated-pattern portion where a spatial frequency is high.

According to a second embodiment of the present invention, there is provided an image display method of displaying an image on an image display panel having a plurality of pixels each including a plurality of subpixels of different colors. The image display method includes the steps of interpolating consecutive sampling values of pieces of input color data supplied to drive the image display panel to thereby correct phases of the pieces of input color data on the basis of positions of the subpixels in each pixel and outputting pieces of output color data; detecting a specific area from the image displayed on the image display panel by processing the pieces of input color data or the pieces of output color data; and computing and outputting weighted averages of the pieces of input color data and the pieces of output color data on the basis of a detection result of detecting the specific area. The specific area is an edge portion, a portion where a luminance level gradually changes, or a repeated-pattern portion where a spatial frequency is high.

According to a third embodiment of the present invention, there is provided a program for allowing a processor to execute an image display method of displaying an image on an image display panel having a plurality of pixels each including a plurality of subpixels of different colors. The image display method includes the steps of interpolating consecutive sampling values of pieces of input color data supplied to drive the image display panel to thereby correct phases of the pieces of input color data on the basis of positions of the subpixels in each pixel and outputting pieces of output color data; detecting a specific area from the image displayed on the image display panel by processing the pieces of input color data or the pieces of output color data; and computing and outputting weighted averages of the pieces of input color data and the pieces of output color data on the basis of a detection result of detecting the specific area. The specific area is an edge portion, a portion where a luminance level gradually changes, or a repeated-pattern portion where a spatial frequency is high.

According to a fourth embodiment of the present invention, there is provided a recording medium having recorded thereon a program for allowing a processor to execute an image display method of displaying an image on an image display panel having a plurality of pixels each including a plurality of subpixels of different colors. The image display method includes the steps of interpolating consecutive sampling values of pieces of input color data supplied to drive the image display panel to thereby correct phases of the pieces of input color data on the basis of positions of the subpixels in each pixel and outputting pieces of output color data; detecting a specific area from the image displayed on the image display panel by processing the pieces of input color data or the pieces of output color data; and computing and outputting weighted averages of the pieces of input color data and the pieces of output color data on the basis of a detection result of detecting the specific area. The specific area is an edge portion, a portion where a luminance level gradually changes, or a repeated-pattern portion where a spatial frequency is high.

According to the structure of the first embodiment of the present invention, there is provided an image display apparatus for displaying an image on an image display panel having a plurality of pixels each including a plurality of subpixels of different colors, the apparatus includes the following elements: an interpolation operator operable to interpolate consecutive sampling values of pieces of input color data supplied to drive the image display panel to thereby correct phases of the pieces of input color data on the basis of positions of the subpixels in each pixel and output pieces of output color data; an area detector operable to detect a specific area from the image displayed on the image display panel by processing the pieces of input color data or the pieces of output color data; and a correction unit operable to compute and output weighted averages of the pieces of input color data and the pieces of output color data on the basis of a detection result obtained by the area detector. The specific area is an edge portion, a portion where a luminance level gradually changes, or a repeated-pattern portion where a spatial frequency is high. Accordingly, the result of interpolation in the edge portion, the portion where the luminance level gradually changes, or the repeated-pattern portion where the spatial frequency is high can be made different from that in the remaining portions. When the pieces of input color data are not phase-corrected in the edge portion or the portion where the luminance level gradually changes, such a portion seems colored, although the color therein is less likely to change depending on the viewing direction. In contrast, even when the pieces of input color data are not phase-corrected in the repeated-pattern portion where the spatial frequency is high, such a portion is less likely to be colored, although the color therein is likely to change depending on the viewing direction. Therefore, according to the structure of the first embodiment, the phases of the pieces of input color data are corrected only in a portion where the coloring is likely to occur and a change in color depending on the viewing direction is less likely to occur, thereby preventing the coloring. Alternatively, the phases of the pieces of input color data are not corrected only in a portion where the coloring is less likely to occur and a change in color depending on the viewing direction is likely to occur, thereby preventing a change in color depending on the viewing direction. In this manner, the phases of the pieces of color data are corrected on the basis of the arrangement (positions) of the subpixels in each pixel to prevent the coloring of an edge or the like, while preventing a change in color depending on the viewing direction.

According to the structures of the second, third, and fourth embodiments of the present invention, there are provided an image display method, a program therefor, and a recording medium having recorded thereon the same in which the phases of the pieces of color data are corrected on the basis of the arrangement (positions) of the subpixels in each pixel, thereby preventing the coloring of an edge or the like while preventing a change in color depending on the viewing direction.

According to the embodiments of the present invention, the phases of pieces of color data are corrected on the basis of the arrangement (positions) of subpixels in each pixel to prevent the coloring of an edge or the like, while preventing a change in color depending on the viewing direction.

DESCRIPTION OF THE PREFERRED EMBODIMENT

Embodiments of the present invention will be described with reference to the accompanying drawings.

(1) Structure

Figure 2:
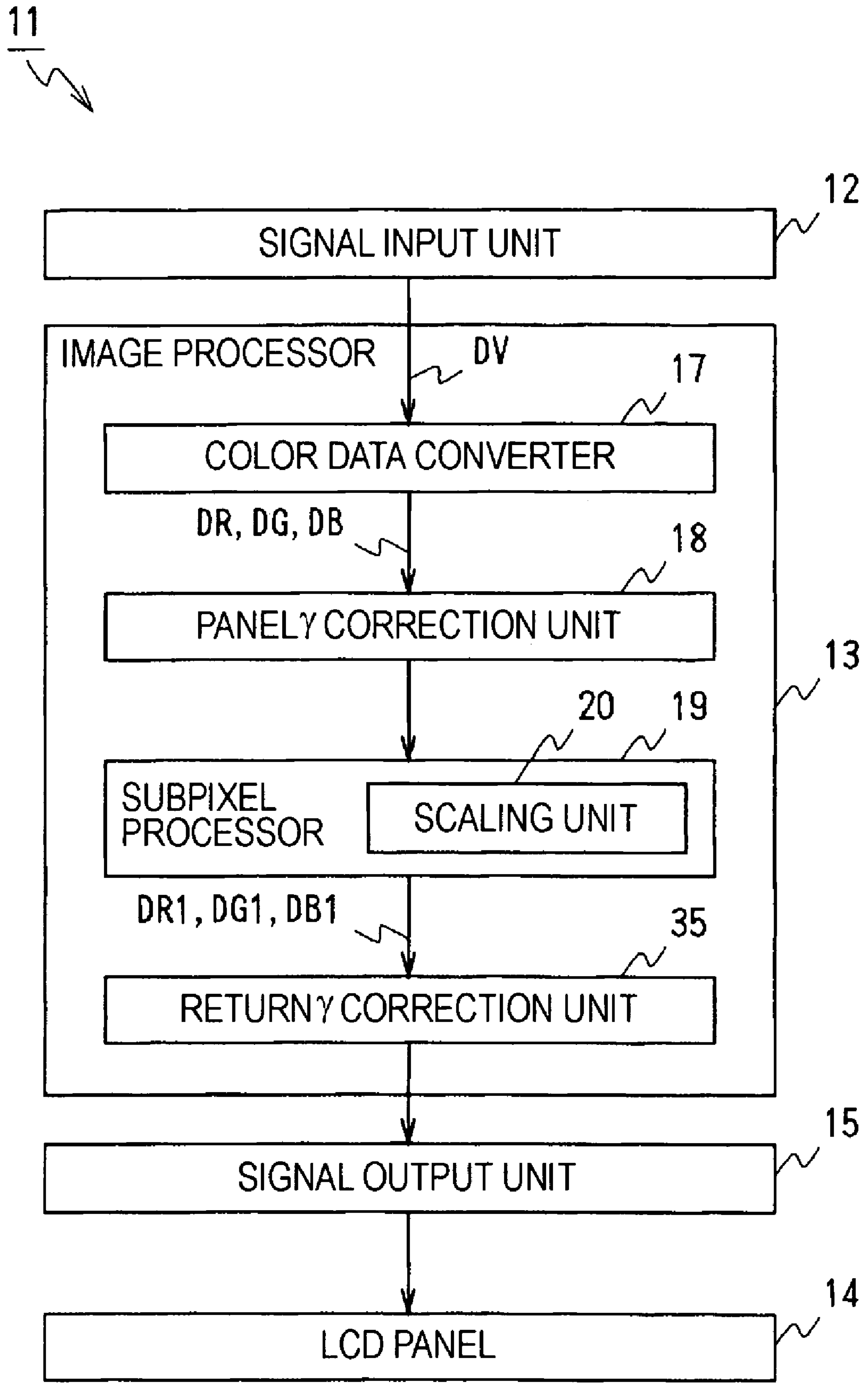
FIG. 2 is a block diagram showing the monitor according to the embodiment of the present invention.
Figure 6:
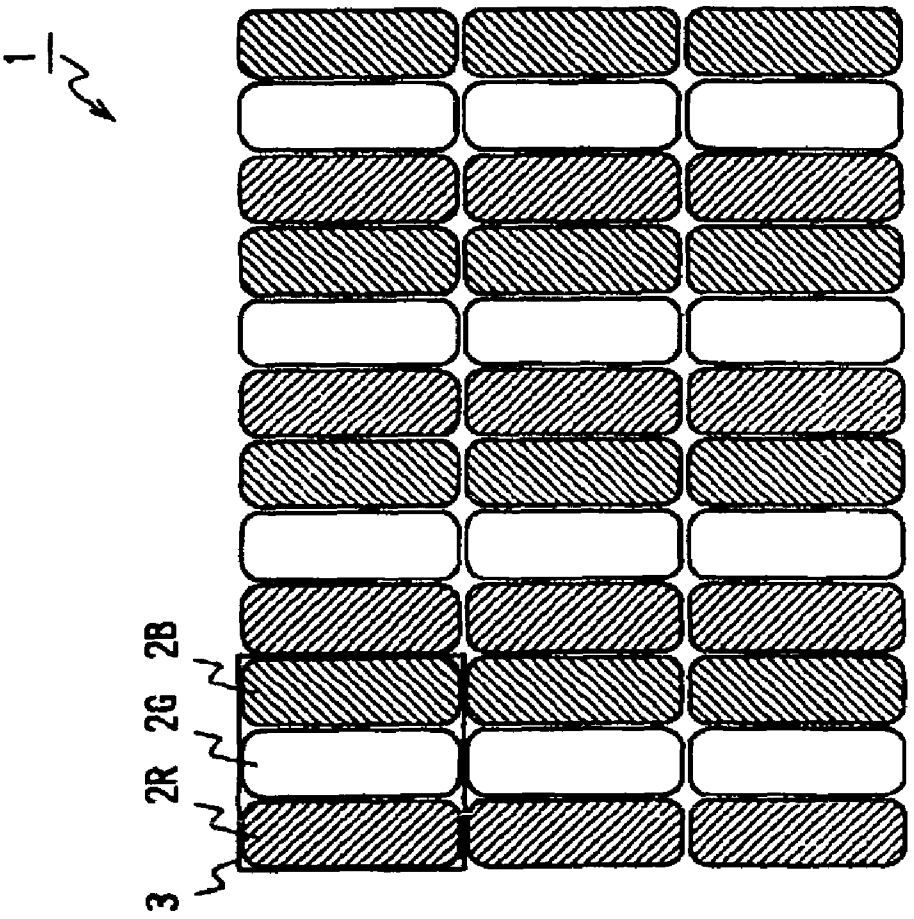
FIG. 6 is a plan view showing the structure of each pixel in a display device.
Figure 7A:
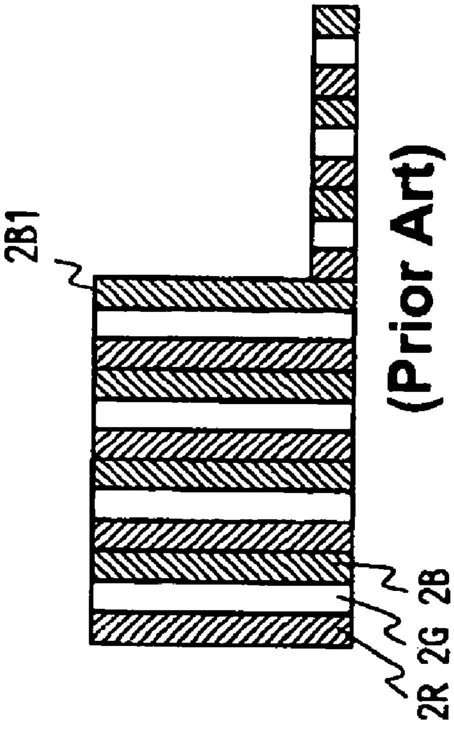
FIGS. 7A to 7D are diagrams schematically illustrating the coloring.
Figure 7B:
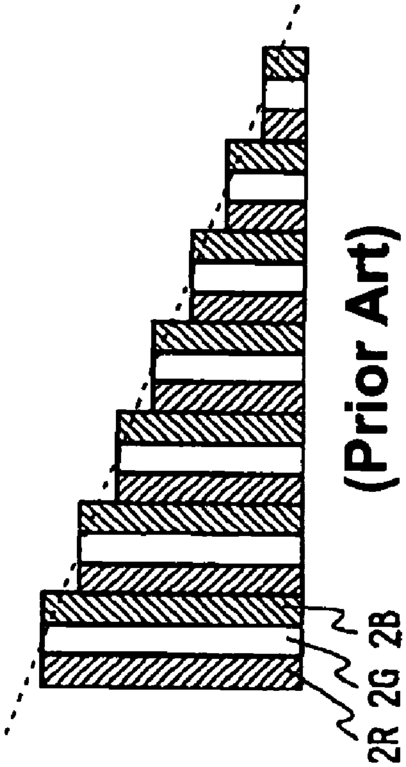
(Prior Art) FIG. 7B
Figure 7C:
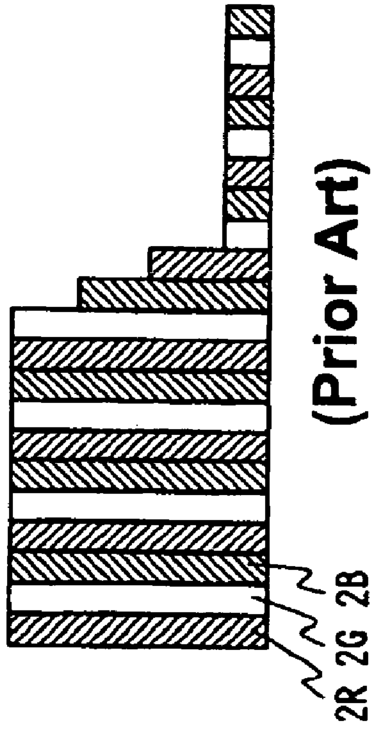
(Prior Art) FIG. 7C
Figure 7D:
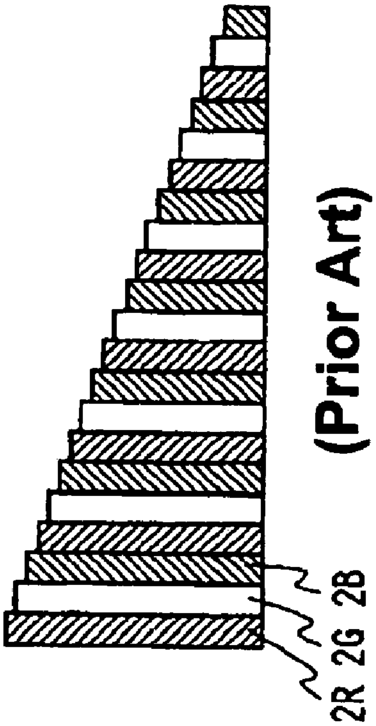
(Prior Art) FIG. 7D
Figure 8A:
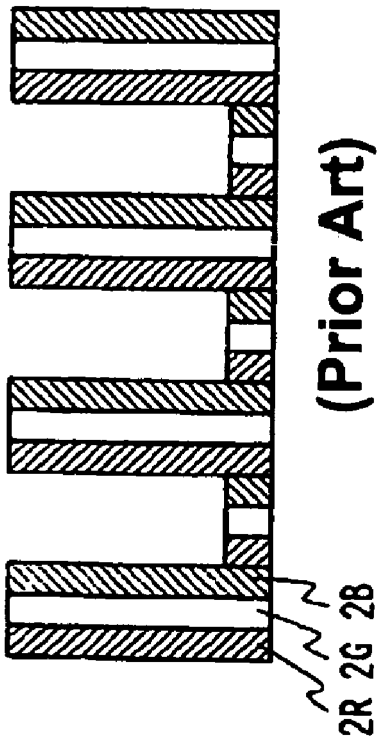
FIG. 8A (Prior Art)
FIGS. 8A to 8D are diagrams schematically illustrating a change in color depending on the viewing direction.
Figure 8B:
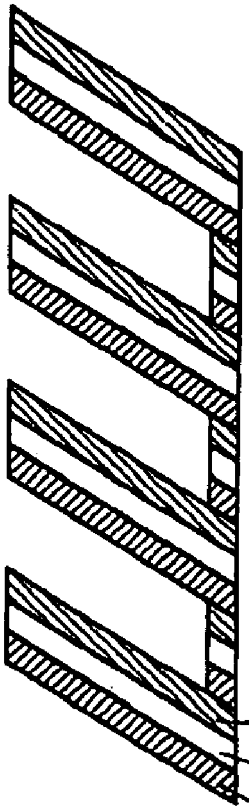
FIG. 8B (Prior Art)
Figure 8C:
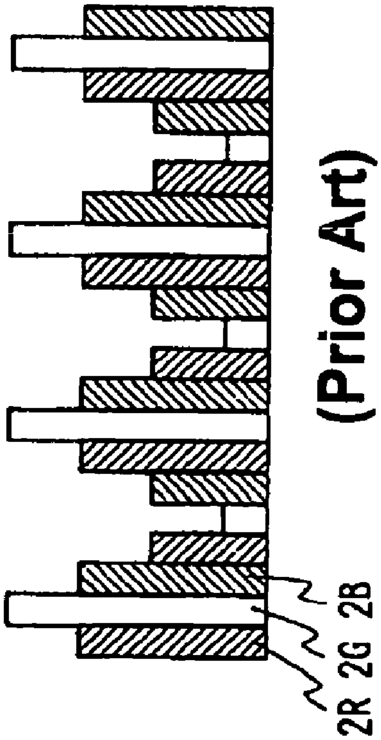
FIG. 8C (Prior Art)
Figure 8D:
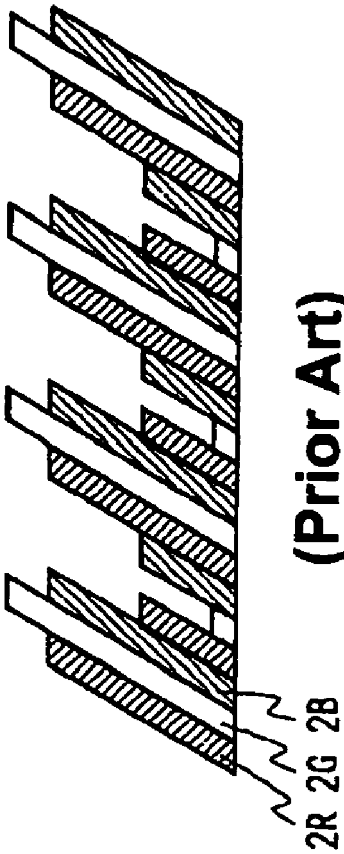
FIG. 8D (Prior Art)

FIG. 2 is a block diagram showing a monitor according to an embodiment of the present invention. In a monitor 11, a signal input unit 12 receives video data DV including a luminance signal and a color-difference signal from various sources including, for example, a tuner, a digital versatile disk (DVD), and a player. An image processor 13 processes the video data DV input from the signal input unit 12 and outputs the processed data. An LCD panel 14 is an image display panel having pixels each including subpixels arranged in a so-called in-line format, as has been described with reference to FIG. 6. A signal output unit 15 drives the LCD panel 14 using output data of the image processor 13. Accordingly, the monitor 11 displays various images on the LCD panel 14 on the basis of the video data DV output from the sources.

The image processor 13 processes the video data DV input from the signal input unit 12 so as to be suitable for driving the signal output unit 15 and outputs the processed video data. In this processing, the image processor 13 corrects the phases of pieces of color data for driving the associated subpixels on the basis of the arrangement (positions) of the subpixels in each pixel of the LCD panel 14, thereby preventing the coloring of an edge or the like.

In the image processor 13, a color data converter 17 converts the video data DV including the luminance signal and the color-difference signal into pieces of color data corresponding to the associated subpixels of the LCD panel 14 by performing matrix calculations. In the embodiment, as has been described with reference to FIG. 6, the LCD panel 14 includes the red, green, and blue subpixels 2R, 2G, and 2B, which are sequentially and recursively arranged in the horizontal direction. The color data converter 17 converts the video data DV including the luminance signal and the color-difference signal into red, green, and blue color data DR, DG, and DB and outputs the color data DR, DG, and DB.

In the image processor 13, the pieces of color data DR, DG, and DB are input via a panel $\gamma$ correction unit 18 to a subpixel processor 19, which in turn corrects the phases of the pieces of color data DR, DG, and DB on the basis of the arrangement (positions) of the subpixels in the LCD panel 14, thereby preventing the coloring of an edge or the like.

Figure 3:
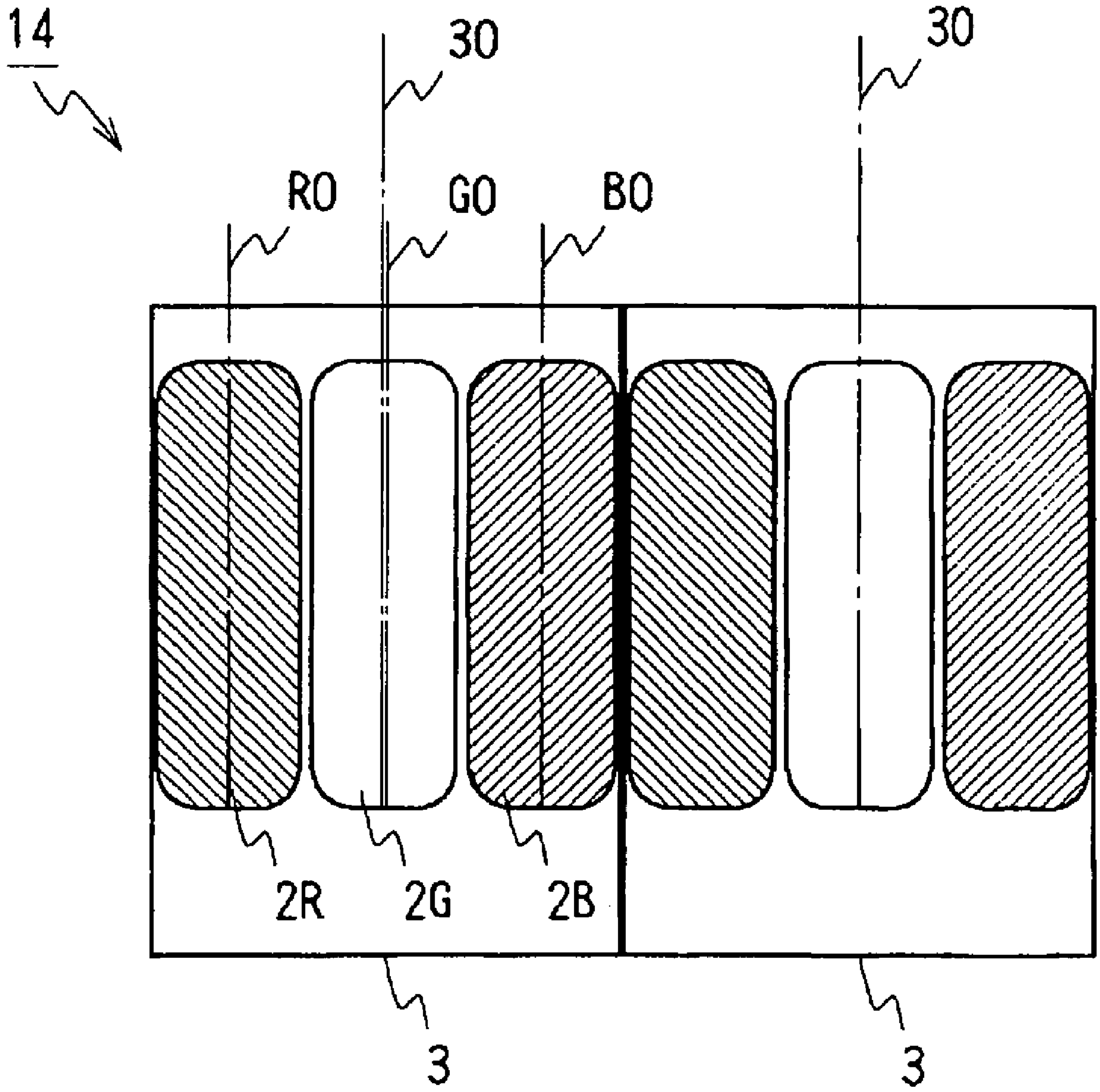
FIG. 3 is a diagram schematically illustrating phase correction in the monitor shown in FIG. 2.

The pieces of color data DR, DG, and DB are sampling values obtained at a timing for scanning the center of each pixel by raster scanning. In contrast, as shown in FIG. 3, the subpixels 2R, 2G, and 2B driven by the associated pieces of color data DR, DG, and DB are arranged at positions shifted from the center 30 of each pixel 3. Due to the differences between the sampling timings of the color data DR, DG, and DB and the actual arrangement (positions) of the subpixels 2R, 2G, and 2B, as has been described with reference to FIGS. 7A to 7D, an edge portion or the like seems to be colored. Thus, a scaling unit 20 in the subpixel processor 19 corrects the phases of the pieces of color data DR, DG, and DB so as to achieve sampling values obtained at timings for scanning the center RO, GO, and BO of the associated subpixels 2R, 2G, and 2B.

More specifically, for example, when the subpixels 2R, 2G, and 2B are of the same size and are arranged at an equal pitch, the center GO of the central green subpixel 2G coincides with the center 30 of the pixel 3. In this case, the associated color data DG is output without being phase-corrected, thereby outputting the green color data DG in terms of the sampling value sampled at a timing for scanning the center GO of the green subpixel 2G.

In contrast, the red subpixel 2R prior to the green subpixel 2G is arranged at a position prior to the green subpixel 2G by a third of a repeating cycle of the pixel 3. By correcting the phase of the red color data DR so that the sampling value sampled at a timing earlier by a third of the repeating cycle is output, the red color data DR can be output in terms of the sampling value sampled at a timing for scanning the center RO of the red subpixel 2R.

In contrast, the blue subpixel 2B subsequent to the green subpixel 2G is arranged at a position subsequent to the green subpixel 2G by a third of the repeating cycle of the pixel 3. By correcting the phase of the blue color data DB so that the sampling value sampled at a timing later by a third of the repeating cycle is output, the blue color data DB can be output in terms of the sampling value sampled at a timing for scanning the center BO of the blue subpixel 2B.

On the basis of this correction principle, the scaling unit 20 corrects the phases of the pieces of color data DR, DG, and DB by interpolating the successive sampling values of the color data DR, DG, and DB.

The interpolation of the successive sampling values may be performed by linear interpolation, cubic interpolation, Sinc function interpolation, or the like. Among these schemes, the linear interpolation is the simplest of all and involves the least number of calculations. However, the linear interpolation is disadvantageous in that the frequency characteristics deteriorate greatly, and hence an image tends to be more out of focus. In contrast, the cubic interpolation can reduce the amount of out-of-focus. However, the cubic interpolation is disadvantageous in that ringing is likely to occur in an edge portion, and such ringing may cause a striking change in color. The interpolation using a Sinc function is advantageous in that it can reduce errors and theoretically can obtain a correct interpolated value by setting the number of convolutions to infinite. Actually, however, it is difficult to set the number of convolutions to infinite. Therefore, in the embodiment, the number of convolutions is limited using a window function.

In this way, in the embodiment, the scaling unit 20 performs the interpolation by performing the Sinc function interpolation using the Lanczos function as the window function:

$$\mathrm{Sinc}(x) = \begin{cases} 1 & \dots\ (x = 0) \\ \dfrac{\sin(2\pi Cx)}{2\pi Cx} & \dots\ (x > 0) \end{cases} \tag{1}$$

$$Lanczos(x) = \begin{cases} 1 & \dots\ (x = 0) \\ \dfrac{\sin(\pi x/N)}{\pi x/N} & \dots\ (0 < x < N) \\ 0 & \dots\ (x \geq N) \end{cases} \tag{2}$$

where N is the number of lobes, and Cx is a cutoff frequency. By adjusting these values, interpolation characteristics and the number of taps of interpolation coefficients are determined. The coefficients for use in the interpolation can be obtained by substituting the phase regarding the position of each of the subpixels 2R, 2G, and 2B for x and computing the product of the Sinc function and the Lanczos function. The scaling unit 20 performs filtering with the coefficients to interpolate the color data DR, DG, and DB. Accordingly, as has been described above, when the subpixels 2R, 2G, and 2B are of the same size and are arranged at an equal pitch, x=0 for the green color data DG, x=−120 degrees for the red color data DR, and x=120 degrees for the blue color data DB.

In the case where the phase of the green color data DG is 0 and the phases of the red and blue color data DR and DB are corrected relative to the green color data DG, the green color data DG is output without being interpolated. Interpolation is performed only on the red and blue color data DR and DB, thereby correcting the phases of the color data DR, DG, and DB. Accordingly, the entire structure can be simplified. In this case, however, because only the red and blue color data DR and DB are interpolated, the resolutions of the red and blue color data DR and DB are reduced compared with that of the green color data DG. In order to prevent such relative reductions in resolution, the phase of the green color data may be set to 30 degrees or 60 degrees, for example, and, on the basis of this phase of the green color data, the phases of the red and blue color data may be set. Thereafter, the pieces of color data DG, DR, and DB may be interpolated.

Figure 4:
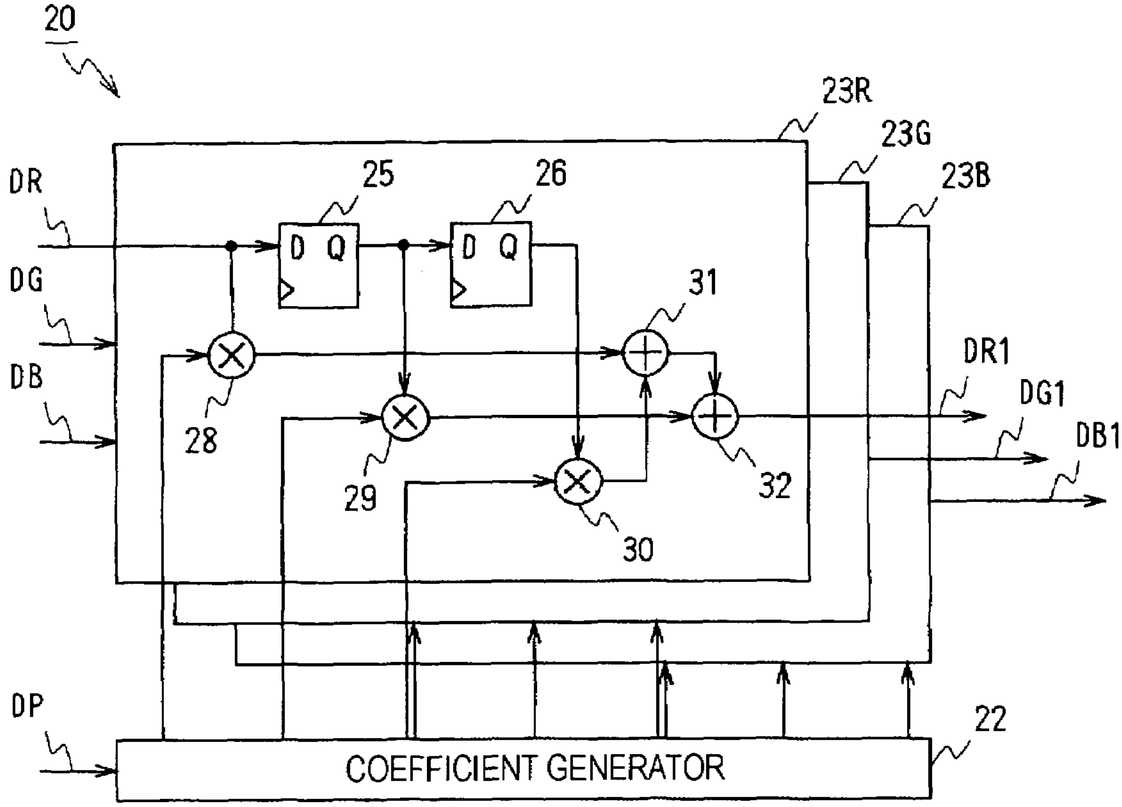
FIG. 4 is a block diagram showing a scaling unit in the subpixel processor shown in FIG. 1.

FIG. 4 is a block diagram showing the structure of the scaling unit 20 in the case where the number of taps of interpolation coefficients is three. In the scaling unit 20, a coefficient generator 22 is a read only memory holding the coefficients described using equations (1) and (2) for the associated phases. On the basis of phase data DP input depending on the setting of the monitor 11, the coefficient generator 22 outputs the coefficients to color data correction units 23R, 23G, and 23B. By switching the phase data DP, the scaling unit 20 can variously adjust the phases for correcting the color data DG, DR, and DB. The coefficients held in the coefficient generator 22 are those multiplied by the gain of the interpolation. Therefore, the gain control can be performed easily in the embodiment.

The color data correction units 23R, 23G, and 23B have the same structure except that different coefficients are input thereto from the coefficient generator 22. Delay circuits 25 and 26 including latch circuits sequentially delay the color data DR, DG, and DB by one clock cycle of the color data DR, DG, and DB to generate three consecutive sampling values of each of the color data DR, DG, and DB.

Multiplier circuits 28, 29, and 30 multiply the three consecutive sampling values of each of the color data DR, DG, and DB by the associated coefficients output from the coefficient generator 22. Adder circuits 31 and 32 add the products of the multiplier circuits 28 to 30 and output the sums. In this manner, the color data correction units 23R, 23G, and 23B perform interpolation using a three-tap interpolation filter to correct the phases of the color data DR, DG, and DB and output the corrected color data DR, DG, and DB.

When practically sufficient characteristics can be ensured, a technique such as a linear interpolation technique may be employed. In this case, for example, the following equations are calculated to obtain, from sampling values Ri, Gi, and Bi of the color data DR, DG, and DB, sampling values SRi, SGi, and SBi of phase-corrected color data DR1, DG1, and DB1:

$$SR_i = \tfrac{1}{3} \times R_{i-1} + \tfrac{2}{3} \times R_i$$

$$SG_i = G_i$$

$$SB_i = \tfrac{2}{3} \times B_i + \tfrac{1}{3} \times B_{i+1} \tag{3}$$

In the case where the coloring of an edge or the like is prevented by correcting the phases of the color data DR, DG, and DB, it is necessary to take into consideration the influence of gamma in a series of transmission lines reaching the eyes of a person.

Figure 5:
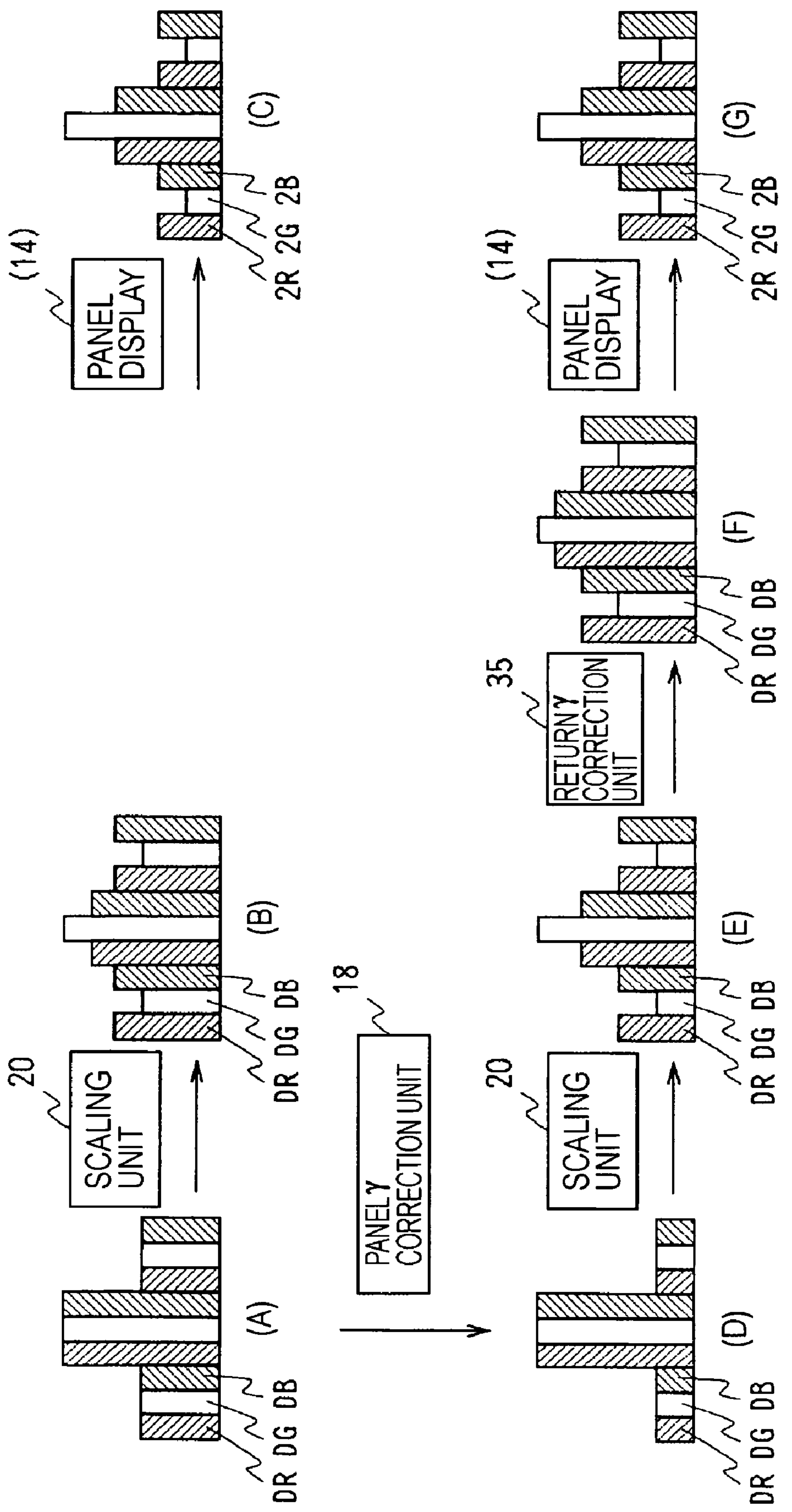
FIG. 5 includes diagrams schematically illustrating gamma correction performed by the subpixel processor shown in FIG. 1.

That is, as shown in portions (A) and (B) of FIG. 5, when the phases of the color data DR, DG, and DB are simply corrected (portion (A) of FIG. 5) to correct the luminance levels of the color data DR, DG, and DB (portion (B) of FIG. 5), because of the gamma of the LCD panel 14 and the gamma of the human visibility characteristics, as shown in portion (C) of FIG. 5, the luminance level balance among the subpixels 2R, 2G, and 2B changes. As a result, a portion such as a black-and-white repeated-fine-pattern portion where the spatial frequency is high is observed to be colored green.

Therefore, in the image processor 13 of the embodiment, the pieces of color data DR, DG, and DB are input via the panel γ correction unit 18 to the subpixel processor 19, and the pieces of color data DR1, DG1, and DB1 output from the subpixel processor 19 are output via a return γ correction unit 35 to the signal output unit 15 (FIG. 2).

The panel γ correction unit 18 corrects the shades of the color data DR, DG, and DB on the basis of the characteristics of the product of the gamma of the LCD panel 14 and the gamma of the human visibility characteristics and outputs the shade-corrected color data. As a result, the shades of the color data DR, DG, and DB are corrected to those actually perceived by a person.

On the basis of the characteristics opposite to those used in the panel γ correction unit 18, the return γ correction unit 35 corrects the shades of the color data DR1, DG1, and DB1 output from the subpixel processor 19, thereby outputting the color data DR1, DG1, and DB1 having the same shades as those of the original color data DR, DG, and DB. The shade correction performed by the panel γ correction unit 18 and the return γ correction unit 35 is performed using, for example, a look-up table.

In the embodiment, as shown in portions (A) and (D) to (G) of FIG. 5 in contrast to portions (A) to (C) of FIG. 5, the color balance is prevented from changing in the portion where the spatial frequency is high.

Figure 1:
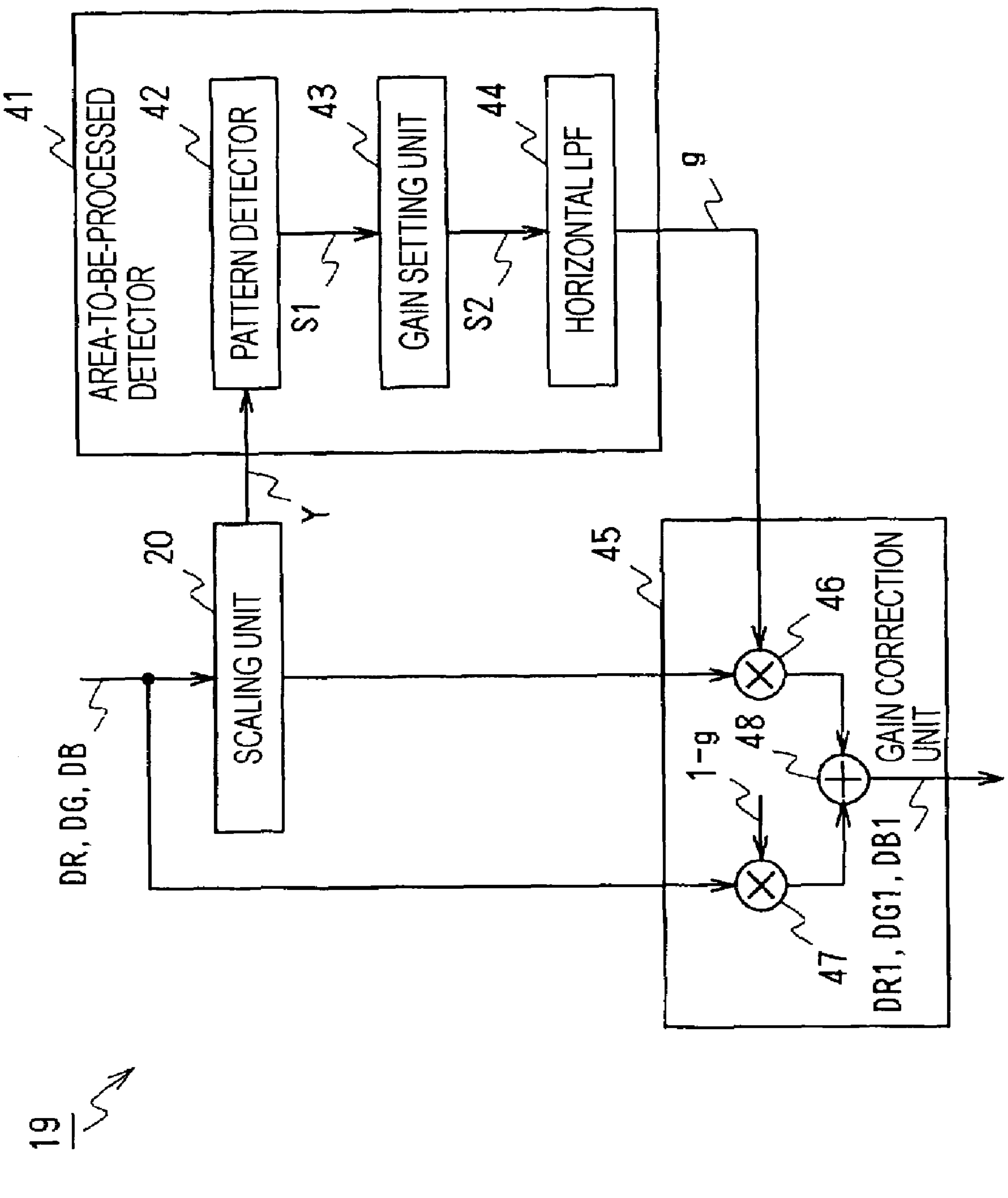
FIG. 1 is a block diagram showing a subpixel processor of a monitor according to an embodiment of the present invention.

By preventing the coloring of an edge or the like by correcting the phases of the pieces of color data on the basis of the arrangement (positions) of the subpixels in each pixel in this manner, as has been described with reference to FIGS. 8A to 8D, because of the characteristics of the LCD panel 14, the color changes depending on the viewing direction. Therefore, in the subpixel processor 19, as shown in FIG. 1, an area-to-be-processed detector 41 detects a specific area, and the processing performed by the subpixel processor 19 is switched between the specific area and the other areas.

That is, this change in color depending on the viewing direction occurs in a repeated-pattern area where the spatial frequency is high. However, in such a repeated-pattern area where the spatial frequency is high, the coloring is less likely to occur even when the phases of the pieces of color data are not corrected. It has thus been found out that the phase correction of the color data in such an area has only a negligible effect on preventing the coloring. In contrast, in an edge portion and a portion where the luminance gradually changes in gradation or the like, the phase correction of the color data has a significant effect on preventing the coloring, and it has also been found out that a change in color depending on the viewing direction is less likely to occur in such areas.

An area where the coloring can be prevented by the phase correction is set as a specific area, and the phases of the color data DR, DG, and DB are corrected only in this area. Accordingly, the coloring of an edge or the like is prevented, while a change in color depending on the viewing direction is prevented. Specifically, in this case, by correcting the phases only in a portion where the luminance level changes at a low/middle frequency, such as an edge or a portion where the luminance level gradually changes, the coloring of the edge or the like is prevented while a change in color depending on the viewing direction is prevented.

Alternatively, an area where the color changes, due to the phase correction, depending on the viewing direction is set as a specific area, and the phases of the pieces of color data are not corrected only in this specific area. As a result, the coloring of an edge or the like is prevented, while a change in color depending on the viewing direction is prevented. Specifically, in this case, a repeated-pattern portion where the spatial frequency is high is set as a specific area, and the phases of the pieces of color data are not corrected in this specific area. Accordingly, the coloring of an edge or the like is prevented, while a change in color depending on the viewing direction is prevented.

In the embodiment, the processing performed by the subpixel processor 19 is switched under the former condition of these two conditions. That is, in the embodiment, the pieces of color data DR1, DG1, and DB1 output from the scaling unit 20 are converted into luminance signals Y using an arithmetic circuit (not shown), and the luminance signals Y are input to the area-to-be-processed detector 41.

The area-to-be-processed detector 41 sets an edge portion and a portion where the luminance level gradual changes as specific areas, and detects the specific areas on the basis of the sequentially-input luminance signals Y. That is, the area-to-be-processed detector 41 determines an edge portion when the following expression holds:

$$|X_i - X_{i-1}| > A|X_{i-1} - X_{i-2}|,\ A|X_{i+1} - X_i| \tag{4}$$

where Xi is the luminance of a pixel with a horizontal coordinate i.

In addition, when one of the following expressions holds, the area-to-be-processed detector 41 determines a portion where the luminance level gradually changes:

$$X_{i-k} \geqq X_{i-k+1} \geqq \ldots \geqq X_{i-1} \geqq X_i \geqq X_{i+1} \geqq \ldots \geqq X_{i+k-1} \geqq X_{i+k} \tag{5}$$

$$X_{i-k} \leqq X_{i-k+1} \leqq \ldots \leqq X_{i-1} \leqq X_i \leqq X_{i+1} \leqq \ldots \leqq X_{i+k-1} \leqq X_{i+k} \tag{6}$$

On the basis of the determination results, the area-to-be-processed detector 41 outputs an area detection signal S1 whose signal level rises in the specific areas.

Techniques for detecting an edge portion and a portion where the luminance level gradually changes are not limited to these techniques described above, and various techniques are widely applicable. Instead of the luminance signals Y, the pieces of color data may be used to detect the specific areas. Instead of detecting an edge portion and a portion where the luminance level gradually changes, a repeated-pattern portion where the spatial frequency is high may be detected, or a portion where the luminance level changes at a low/middle frequency may be detected. To detect the repeated-pattern area where the spatial frequency is high or the like, the pieces of color data may be used instead of the luminance signals. Alternatively, these various detection schemes may be combined and used. Alternatively, the specific areas may be detected using the data input to the scaling unit 20, instead of using the data output from the scaling unit 20.

A gain setting unit 43 corrects the gain of the area detection signal S1 output from a pattern detector 42 and outputs an area detection signal S2 that rises to the value one in an area where the phases of the pieces of color data DR, DG, and DB are to be corrected and that rises to the value zero in an area where the phases of the pieces of color data DR, DG, and DB are not to be corrected.

A horizontal low-pass filter (LPF) 44 limits the frequency band of the area detection signal S2 output from the gain setting unit 43 and outputs a filtered signal g.

In a gain correction unit 45, a multiplier circuit 46 multiplies the pieces of color data output from the scaling unit 20 by the output value g of the horizontal LPF 44. A multiplier circuit 47 multiplies the pieces of color data input to the subpixel processor 19 by the value 1-g, which is obtained by subtracting the output value g of the horizontal LPF 44 from the value one. The pieces of output data of the multiplier circuits 46 and 47 are added by an adder circuit 48, which in turn outputs the color data DR1, DG1, and DB1. In this manner, the gain correction unit 45 computes and outputs the weighted averages of the color data DR, DG, and DB input to the scaling unit 20 and the color data DR1, DG1, and DB1 output from the scaling unit 20 on the basis of the detection results obtained by the area-to-be-processed detector 41.

(2) Operation

With the above-described structure of the monitor 11 (FIG. 2), video data DV including a luminance signal and a color-difference signal is input from the signal input unit 12 to the color data converter 17 in the image processor 13. The color data converter 17 converts the video data DV into color data DR, DG, and DB corresponding to the associated subpixels of the LCD panel 14. The signal output unit 15 supplies the pieces of color data to drive the associated subpixels of the LCD panel 14. Accordingly, the monitor 11 displays an image based on the video data DV on the LCD panel 14.

However, the pieces of color data DR, DG, and DB generated from the video data DV in this manner (FIGS. 7A to 7D) are the sampling values obtained by sampling at a timing for scanning the center of each pixel 3 (FIG. 3). When the pieces of color data DR, DG, and DB are supplied without being processed to drive the LCD panel 14, an edge portion and a portion where the luminance level gradually changes become colored.

Therefore, in the monitor 11, the phases of the pieces of color data DR, DG, and DB generated from the video data DV are corrected by the scaling unit 20 in the subpixel processor 19 (FIG. 4) on the basis of the arrangement (positions) of the subpixels in each pixel to generate pieces of color data DR1, DG1, and DB1. Using the color data DR1, DG1, and DB1, the LCD panel 14 is driven. This enables the monitor 11 to prevent the coloring of an edge portion and a portion where the luminance level gradually changes.

However, when the coloring is prevented in this manner, the color changes in a repeated-pattern area where the spatial frequency is high depending on the viewing direction (FIGS. 8A to 8D).

Therefore, the monitor 11 processes the color data in the following manner (FIG. 1). The pattern detector 42 in the area-to-be-processed detector 41 detects a specific area where the coloring occurs or a specific area where the color changes depending on the viewing direction. On the basis of the area detection result, the gain correction unit 45 computes and outputs the weighted averages of the phase-corrected color data DR1, DG1, and DB1 and the uncorrected color data DR, DG, and DB.

In specific areas where the coloring occurs, namely, in an edge portion and a portion where the luminance level gradually changes, the color is less likely to change depending on the viewing direction. Therefore, such a portion where the coloring occurs is set as a specific area, and, on the basis of the detection result of the specific area, the weighted averages of the phase-corrected color data DR1, DG1, and DB1 and the uncorrected color data DR, DG, and DB are computed and output, thereby preventing a change in color depending on the viewing direction while preventing the coloring.

In contrast, the coloring is less likely to occur in a repeated-pattern portion where the spatial frequency is high, which is a portion where the color changes depending on the viewing direction. Therefore, such a portion where the color changes depending on the viewing direction is set as a specific area, and, on the basis of the detection result of the specific area, the weighted averages of the phase-corrected color data DR1, DG1, and DB1 and the uncorrected color data DR, DG, and DB are computed and output, thereby preventing the coloring while preventing a change in color depending on the viewing direction.

In this manner, according to the embodiment, the coloring of an edge or the like is prevented by correcting the phases of the pieces of color data on the basis of the arrangement (positions) of the subpixels in each pixel, while preventing a change in color depending on the viewing direction.

More specifically, according to the embodiment, the phases of the pieces of color data are corrected by the scaling unit 20 on the basis of the arrangement (positions) of the subpixels in each pixel. In this manner, the phase of the color data DG corresponding to the green subpixel arranged at the center of each pixel is not corrected, and the color data DG is output without being corrected. On the basis of the positions in each pixel relative to the subpixel corresponding to the color data DG whose phase is not corrected, the phases of the color data DR and DB corresponding to the remaining subpixels are corrected. Thus, the phases of the pieces of color data DR, DG, and DB are corrected.

According to the embodiment, among the three pieces of color data DR, DG, and DB, the phases of only the two pieces of color data DR and DB are corrected. Thus, the entire structure can be simplified. Instead of the color data DG corresponding to the central subpixel, the phase of the prior color data DR or the subsequent color data DB may not be corrected, and the phases of the remaining pieces of color data may be corrected. In this way, the entire structure may similarly be simplified.

Instead of correcting the phases of only the two pieces of color data DR and DB, the phases of all the three pieces of color data DR, DG, and DB may be corrected. In this way, a relative change in resolution among the three pieces of color data DR, DG, and DB is prevented.

In the monitor 11, the phases of pieces of color data are corrected by performing interpolation using the consecutive sampling values of the associated pieces of color data. The interpolation is performed using a Sinc function, and hence the phases of the pieces of color data are corrected with high accuracy.

On the basis of the detection result of the specific area, the weighted averages of the phase-corrected color data DR1, DG1, and DB1 and the uncorrected color data DR, DG, and DB are computed. The detection result of the specific area is band-limited by the horizontal LPF 44 and is supplied to compute the weighted averages. In this manner, unnaturalness caused by frequently switching between the phase-corrected color data DR1, DG1, and DB1 and the uncorrected color data DR, DG, and DB can be avoided.

When the coloring as well as a change in color depending on the viewing direction are prevented in this manner, in the end, such coloring and a change in color depending on the viewing direction are perceived by a person. Therefore, it is necessary to take into consideration the human vision characteristics when performing a series of steps of processing the color data DR, DG, and DB. When the pieces of color data DR, DG, and DB are processed without taking into consideration the vision characteristics, a color corresponding to color data whose phase is least corrected becomes striking in a black-and-white repeated-pattern portion where the spatial frequency is high (FIG. 5).

Therefore, the monitor 11 processes the color data DR, DG, and DB in the following manner (FIG. 2). The panel γ correction unit 18 corrects the shades of the color data DR, DG, and DB on the basis of the gamma of the LCD panel 14 and the gamma of the human visibility characteristics. Thereafter, the subpixel processor 19 performs a series of steps to prevent the coloring as well as a change in color depending on the viewing direction. Thereafter, the return γ correction unit 35 restores the original gamma. In this manner, the monitor 11 prevents a black-and-white repeated-pattern portion where the spatial frequency is high from being colored with a specific color.

(3) Advantages

With the above-described structure, the coloring of an edge or the like is prevented by correcting the phases of pieces of color data on the basis of the arrangement (positions) of subpixels in each pixel. On the basis of the detection result of a specific area, the weighted averages of the pieces of coloring-prevented color data and the pieces of input color data are computed and output. As a result, the coloring of an edge or the like is prevented by correcting the phases of the pieces of color data on the basis of the arrangement (positions) of the subpixels in each pixel, while preventing a change in color depending on the viewing direction.

Among the plurality of subpixels included in each pixel, the color data corresponding to one subpixel is output without being phase-corrected, and the phases of the remaining pieces of color data are corrected on the basis of the positions relative to the subpixel corresponding to the uncorrected color data. Accordingly, the entire structure can be simplified.

Alternatively, the phases of all the pieces of color data corresponding to the plurality of subpixels included in each pixel may be corrected, thereby preventing a relative change in resolution among these pieces of color data.

After the shades of the pieces of input color data are corrected on the basis of the gamma of an image display panel and the gamma of the human visibility characteristics and the phases of the pieces of input color data are corrected, the original shades are restored. Accordingly, the coloring of a repeated-pattern portion where the spatial frequency is high can be prevented.

Because such interpolation for correcting the phases is performed using a Sinc function, the phases can be corrected very accurately, while preventing deterioration of image quality.

By band-limiting the detection result of the specific area and outputting the result to compute the weighted averages, unnaturalness caused by frequently switching between the phase-corrected color data and the uncorrected color data can be avoided.

In the above-described embodiment, the case has been described in which, with regard to the driving of an image display panel including subpixels that are sequentially and recursively arranged in the horizontal direction in a so-called in-line format, the coloring and a change in color depending on the viewing direction are prevented. However, the present invention is not limited to this case. Alternatively, the present invention may be applied to the driving of an image display panel including subpixels that are sequentially and recursively arranged in the horizontal and vertical directions in a so-called delta format, and the coloring and a change in color depending on the viewing direction may be prevented. In this case, it is necessary for the above-described scaling unit 20 and the area-to-be-processed detector 41 to perform the two-dimensional processing in the horizontal and vertical directions so as to correspond to the two-dimensional arrangement of the subpixels, which are sequentially and recursively arranged.

In the above-described embodiment, the case has been described in which the present invention is applied to a monitor using an LCD panel. However, the present invention is not limited to this case. For example, the present invention is widely applicable to monitors using various types of image display panels including PDPs, field emission displays (FEDs), and the like.

In the above-described embodiment, the case where each pixel includes red, green, and blue subpixels has been described. However, the present invention is not limited to this case. The present invention is widely applicable to, for example, the case where each pixel includes subpixels of four colors.

In the above-described embodiment, the case has been described in which the present invention is applied to a monitor with an image display panel. However, the present invention is not limited to this case. The present invention is widely applicable to various types of image display apparatuses outputting various types of image content based on color data and displaying images on monitors.

In the above-described embodiment, the case has been described in which video data is processed by the structure of hardware to display an image. However, the present invention is not limited to this case. The present invention is widely applicable to the case where an image is displayed by software processing using a program according to an embodiment of the present invention, such as an image display program in a computer. In this case, the program may be provided in the following manner. For example, the program may be installed in advance in an apparatus for performing the processing. Alternatively, the program may be recorded on a recording medium, such as an optical disk, a magnetic disk, or a memory card. Alternatively, the program may be downloaded via a network, such as the Internet.

It should be understood by those skilled in the art that various modifications, combinations, sub-combinations, and alterations may occur depending on design requirements and other factors insofar as they are within the scope of the appended claims or the equivalents thereof.

What is claimed is:

1. An image display apparatus for displaying an image on an image display panel having a plurality of pixels, the plurality of pixels each including a plurality of subpixels of different colors, the apparatus comprising:

an interpolation operator operable to interpolate consecutive sampling values of pieces of input color data of each of the plurality of subpixels supplied to drive the image display panel to thereby correct phases of the pieces of input color data of each of the plurality of subpixels based on positions of the plurality of subpixels in each pixel and output pieces of output color data;

an area detector operable to detect a specific area from the image displayed on the image display panel by processing the pieces of input color data of each of the plurality of subpixels or the pieces of output color data; and a correction unit operable to compute and output weighted averages of the pieces of input color data of each of the plurality of subpixels and the pieces of output color data on the basis of a detection result obtained by the area detector;

wherein the specific area is an edge portion, a portion where a luminance level gradually changes, or a repeated-pattern portion where a spatial frequency is high.

2. An image display apparatus for displaying an image on an image display panel having a plurality of pixels, the plurality of pixels each including a plurality of subpixels of different colors, the apparatus comprising:

an interpolation operator operable to interpolate consecutive sampling values of pieces of input color data supplied to drive the image display panel to thereby correct phases of the pieces of input color data based on positions of the plurality of subpixels in each pixel and output pieces of output color data;

an area detector operable to detect a specific area from the image displayed on the image display panel by processing the pieces of input color data or the pieces of output color data; and a correction unit operable to compute and output weighted averages of the pieces of input color data and the pieces of output color data on the basis of a detection result obtained by the area detector;

wherein the specific area is an edge portion, a portion where a luminance level gradually changes, or a repeated-pattern portion where a spatial frequency is high;

wherein, for one subpixel from among the plurality of subpixels included in each pixel, the interpolation operator does not correct the phase of the associated piece of input color data and outputs the uncorrected piece of output color data, and wherein, for the other subpixels from among the plurality of subpixels included in each pixel, the interpolation operator corrects the phases of the associated pieces of input color data on the basis of the positions relative to the one subpixel with reference to a repeating cycle of each pixel and outputs the corrected pieces of output color data.

3. The image display apparatus according to claim 1, wherein the interpolation operator corrects the phases of all the pieces of input color data corresponding to the plurality of subpixels included in each pixel and outputs the corrected pieces of output color data.

4. An image display apparatus for displaying an image on an image display panel having a plurality of pixels, the plurality of pixels each including a plurality of subpixels of different colors, the apparatus comprising:

an interpolation operator operable to interpolate consecutive sampling values of pieces of input color data supplied to drive the image display panel to thereby correct phases of the pieces of input color data based on positions of the plurality of subpixels in each pixel and output pieces of output color data;

an area detector operable to detect a specific area from the image displayed on the image display panel by processing the pieces of input color data or the pieces of output color data;

a correction unit operable to compute and output weighted averages of the pieces of input color data and the pieces of output color data on the basis of a detection result obtained by the area detector;

a gamma correction unit operable to correct shades of the pieces of input color data on the basis of gamma of the image display panel and gamma of human visibility characteristics and output pieces of shade-corrected color data to the interpolation operator; and a return gamma correction unit operable to correct the shades of the pieces of color data output from the correction unit on the basis of characteristics opposite to those used in the gamma correction unit and output the pieces of shade-corrected color data;

wherein the specific area is an edge portion, a portion where a luminance level gradually changes, or a repeated-pattern portion where a spatial frequency is high.

5. An image display apparatus for displaying an image on an image display panel having a plurality of pixels, the plurality of pixels each including a plurality of subpixels of different colors, the apparatus comprising:

an interpolation operator operable to interpolate consecutive sampling values of pieces of input color data supplied to drive the image display panel to thereby correct phases of the pieces of input color data based on positions of the plurality of subpixels in each pixel and output pieces of output color data;

an area detector operable to detect a specific area from the image displayed on the image display panel by processing the pieces of input color data or the pieces of output color data; and a correction unit operable to compute and output weighted averages of the pieces of input color data and the pieces of output color data on the basis of a detection result obtained by the area detector;

wherein the specific area is an edge portion, a portion where a luminance level gradually changes, or a repeated-pattern portion where a spatial frequency is high;

wherein the area detector includes a low-pass filter operable to limit the band of the detection result of the specific area; and wherein the correction unit computes the weighted averages using an output value of the low-pass filter.

6. An image display method of displaying an image on an image display device having a plurality of pixels each including a plurality of subpixels of different colors, the method comprising the steps of:

interpolating consecutive sampling values of pieces of input color data of each of the plurality of subpixels supplied to drive the image display panel to thereby correct phases of the pieces of input color data of each of the plurality of subpixels based on positions of the plurality of subpixels in each pixel and outputting pieces of output color data;

detecting a specific area from the image displayed on the image display panel by processing the pieces of input color data of each of the plurality of subpixels or the pieces of output color data; and computing and outputting weighted averages of the pieces of input color data of each of the plurality of subpixels and the pieces of output color data based on a detection result of detecting the specific area;

wherein the specific area is an edge portion, a portion where a luminance level gradually changes, or a repeated-pattern portion where a spatial frequency is high.

7. A recording medium having recorded thereon a program for allowing a processor to execute an image display method of displaying an image on an image display panel having a plurality of pixels each including a plurality of subpixels of different colors, the method comprising the steps of:

interpolating consecutive sampling values of pieces of input color data of each of the plurality of subpixels supplied to drive the image display panel to thereby correct phases of the pieces of input color data of each of the plurality of subpixels based on positions of the plurality of subpixels in each pixel and outputting pieces of output color data;

detecting a specific area from the image displayed on the image display panel by processing the pieces of input color data of each of the plurality of subpixels or the pieces of output color data; and computing and outputting weighted averages of the pieces of input color data of each of the plurality of subpixels and the pieces of output color data based on a detection result of detecting the specific area;

wherein the specific area is an edge portion, a portion where a luminance level gradually changes, or a repeated-pattern portion where a spatial frequency is high.

* * * * *